United States Patent [19]
Hauser

[11] Patent Number: 5,492,301
[45] Date of Patent: Feb. 20, 1996

[54] CHRISTMAS TREE STAND

[76] Inventor: Robert J. Hauser, 3600 Old Mooringsport Rd., Shreveport, La. 71107

[21] Appl. No.: 292,936

[22] Filed: Aug. 18, 1994

[51] Int. Cl.[6] .................................................. F16M 13/00
[52] U.S. Cl. ...................... 248/516; 47/40.5; 248/188.4; 248/188.7; 248/523
[58] Field of Search .................................. 248/516, 515, 248/514, 519, 523, 521, 181, 188.4, 188.7; 47/40.5

[56] References Cited

U.S. PATENT DOCUMENTS

| | | | |
|---|---|---|---|
| 2,679,994 | 6/1954 | Mellen | 248/526 X |
| 2,746,700 | 5/1956 | Barbera | 47/40.5 |
| 2,893,668 | 7/1959 | Applegate | 248/516 |
| 2,933,274 | 4/1960 | Mansolf | 47/40.5 |
| 2,997,264 | 8/1961 | Zelenitz | 248/516 |
| 3,586,281 | 6/1971 | Schumer | 248/231.7 |
| 3,648,957 | 3/1972 | Bencriscutto | 248/521 |
| 3,779,493 | 12/1973 | Gidlof | 47/40.5 |
| 4,099,697 | 7/1978 | Schuckmann | 248/604 |
| 4,156,323 | 5/1979 | Scheffler | 248/516 X |
| 4,571,882 | 2/1986 | Capen | 47/40.5 |
| 4,699,347 | 10/1987 | Kuhnley | 47/40.5 X |
| 4,978,098 | 12/1990 | Peckinpaugh | 248/188.7 X |
| 5,203,039 | 4/1993 | Fredman | 248/188.4 X |
| 5,393,031 | 2/1995 | Leve | 248/516 |
| 5,398,444 | 3/1995 | Murray | 248/181 X |

Primary Examiner—Ramon O. Ramirez
Attorney, Agent, or Firm—John M. Harrison

[57] ABSTRACT

A Christmas tree stand which is characterized by a base for resting on a supporting surface, a ball assembly swivally secured to the base in universally-pivoting relationship by means of a fixed socket bracket and a cooperating movable socket bracket and a mount cup secured to the ball assembly for receiving and mounting the trunk of a Christmas tree. The mount cup and ball assembly are designed to pivot and swivel in a 360-degree rotation to orient the tree in a vertical position regardless of the configuration of the trunk. In a preferred embodiment accessory leg extensions are adjustably slidably extendable from the base for further stabilizing the Christmas tree stand.

7 Claims, 1 Drawing Sheet

U.S. Patent
Feb. 20, 1996
5,492,301
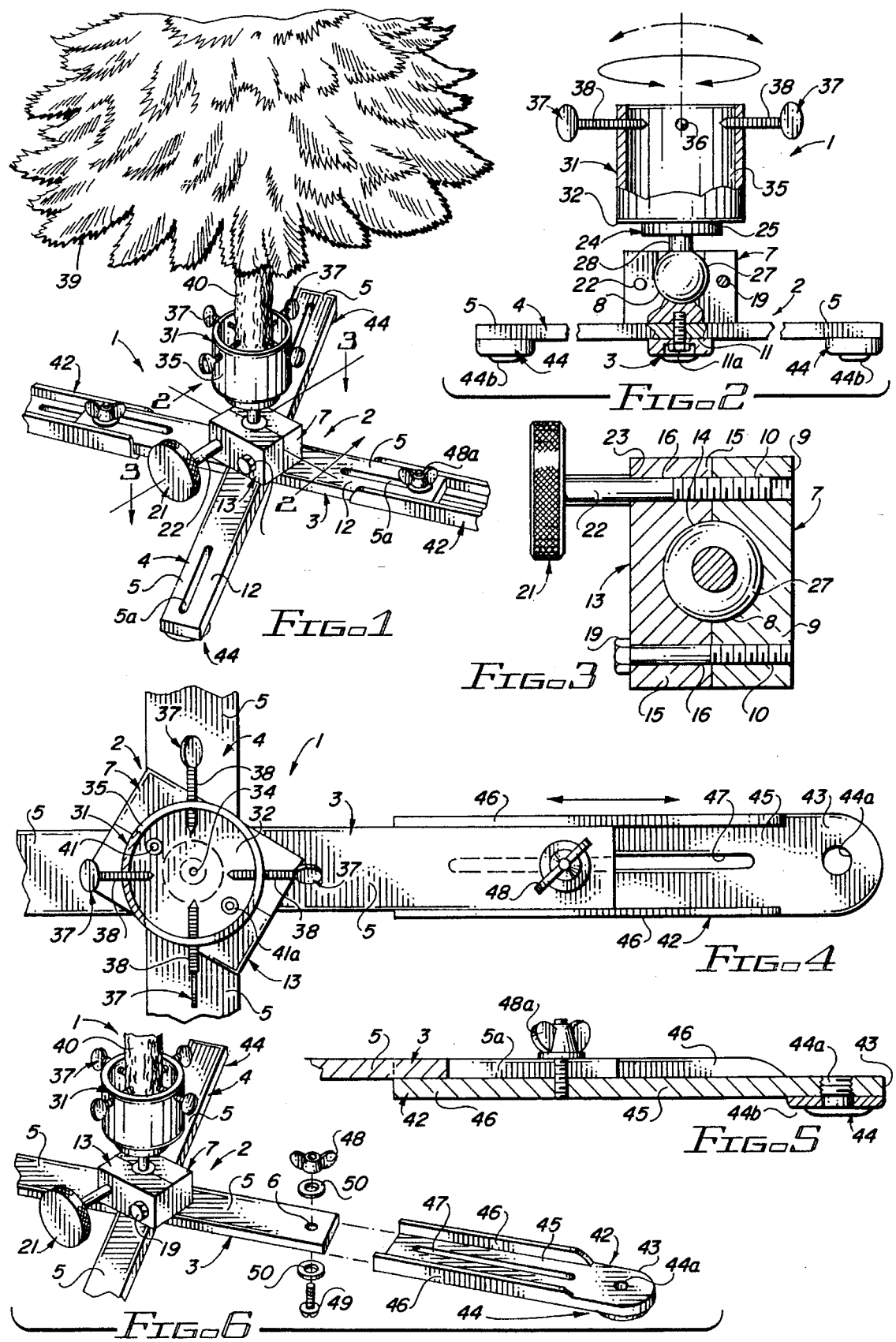

5,492,301

CHRISTMAS TREE STAND

BACKGROUND OF THE INVENTION

1. Field of the Invention

This invention relates to tree-supporting stands and more particularly, to a Christmas tree support or stand which is characterized by a stable base provided with a fixed socket bracket and a movable socket bracket, a ball assembly swivally mounted on the base in cooperation with the fixed and movable socket brackets in universally pivotal relationship and a mount cup attached to the ball assembly for receiving the Christmas tree trunk, in order to vertically support a Christmas tree having a straight or crooked trunk. In a preferred embodiment accessory leg extensions are adjustably extendable from the base for further stabilizing the Christmas tree stand.

One of the problems which exists during the Christmas season is that of supporting and stabilizing Christmas trees in a vertical position on a floor or table. This problem is intensified if the Christmas tree has a crooked trunk or a trunk of varying diameter, such that conventional Christmas tree stands will not receive and vertically support the tree in a stable manner. Accordingly, it is frequently necessary to custom-design a Christmas tree stand to the particular tree in question, an operation which is frequently quite time-consuming, since it requires taking into consideration the crooked trunk and the trunk diameter.

The Christmas tree stand detailed in this application is characterized by a stable base which is adapted to be placed on a floor or table, a ball assembly which is pivotally and swivally attached to cooperating fixed and movable socket bracket elements provided on the base and a mount cup attached to the ball assembly, which mount cup is of sufficient size to receive and support a Christmas tree having a trunk of substantial diameter. Since the mount cup can swivel or pivot in any direction with respect to the base, compensation for a crooked trunk can be effected and the top and major trunk portions of the Christmas tree can be oriented in a substantially vertical position without the necessity of custom-designing a Christmas tree stand for the tree.

2. Description of the Prior Art

Early Christmas tree stands were constructed of wood and were custom-fitted to the trunk of the Christmas tree in question. For example, a wooden slat or board was commonly nailed to another slat or board in perpendicular orientation using a single nail, which was in turn driven into the end portion of the Christmas tree trunk. The tree was then placed in an upright position with the slats located on the floor or on a supporting surface and braces were attached to the trunk and the boards or slats to support the tree in a vertical configuration. Later designs included various configurations constructed of metal for universally mounting a Christmas tree in vertical orientation. U.S. Pat. No. 2,746,700, dated May 22, 1956, to R. J. Barbera, discloses a "Christmas Tree Stand". The Christmas tree stand detailed in this patent includes a base member having a ball and socket arrangement which is fitted with a lever and a spike extending from the ball for mounting the trunk of a Christmas tree. When the Christmas tree trunk is mounted on the spike, the ball is adjustable by means of the lever to orient the tree in a vertical configuration. Another "Christmas Tree Stand" is disclosed in U.S. Pat. No. 2,933,274, dated Apr. 19, 1960, to Paul Mausolf. This stand also includes a ball and socket combination mounted in a base, with curved metal straps extending from the base to assist in orienting the trunk of the Christmas tree in an upright position. U.S. Pat. No. 3,648,957, dated Mar. 14, 1972, to Michael Bencriscutto, discloses a Pivotable Tree Stand. The pivotable tree stand permits convenient rotation of the tree relative to the stand, in order to present various portions of the tree to view and for easy accessibility when applying ornaments. Axially-telescoping sleeves are provided, which permit selecting the sleeve which suits the diameter of the tree trunk. A bevelled upper cutting edge is provided on the sleeves to permit the latter to be driven upon the trunk. A "Stand For Christmas Trees" is disclosed in U.S. Pat. No. 3,779,493, dated Dec. 18, 1973, to Karl G. Gidlof. Retaining means, such as clasps, are provided to secure a tree trunk in a water container and a ball joint is also provided to permit adjustment of the alignment of the water container relative to the base supporting the container. The ball joint outer concave portion includes two sections, one of which is rigid and the other movable relative to the first by means of an eccentric shaft operated by an actuating lever. U.S. Pat. No. 3,586,281, dated Jun. 22, 1971, to Lewis Schumer, discloses a "Wig Block Holder" which is capable of securely affixing a mannequin head form to a table top and for rotatably varying the position of the head form with respect to the table top by means of a handle. The holder includes a clamping device to be secured to the edge of a table, a ball socket connection provided with a standard receivable in a recess located in the head block and a pressure plate which rests on the ball and slidably interconnects and is activated by a handle. Movement of the handle in a downward direction locks the ball into position, whereas upward movement of the handle permits the ball to rotate freely into other desired positions. U.S. Pat. No. 4,099,697, dated Jul. 11, 1978, to Alfred V. Schuckmann, discloses a "Tilting Post-Supported Seat Biased To An Upright Position". The patent details a stool-like seat for limited mobility of the user with a high action radius characterized by a base formed to the ball socket and a post carrying the seat surface and provided with a ball which is receivable in the socket. The post has a downwardly-extending member engaging, within the base, a star-like array of tension springs which resist angular displacement of the posts and bias the latter into a normal, upright position.

It is an object of this invention to provide a new and improved tree support or stand having a base and a trunk-receiving member adjustably pivotally attached to the base for supporting a tree or plant having a straight or crooked trunk in substantially vertically-oriented configuration.

Another object of this invention is to provide a Christmas tree stand which is characterized by a base for resting on a supporting surface; a fixed socket bracket secured to the base and a movable socket bracket removably secured to the fixed socket bracket; a ball assembly pivotally carried by the socket brackets; and a mount cup secured to the ball assembly for receiving the straight or crooked trunk of a Christmas tree and orienting the Christmas tree in substantially vertical configuration responsive to adjustable pivoting of the mount cup and ball assembly with respect to the base.

Yet another object of this invention is to provide a new and improved Christmas tree stand for orienting a Christmas tree having a straight or crooked trunk in substantially vertical configuration, which Christmas tree stand includes a base characterized by an elongated, horizontal bottom base member and an elongated top base member perpendicularly and horizontally mounted on the bottom base member, with a fixed socket bracket mounted on the top base member and a movable socket bracket removably mounted on the fixed socket bracket, a ball assembly pivotally and swivally mounted in the socket brackets for 360 degree rotation with respect to the base and a mount cup secured to the ball assembly for receiving the trunk of the Christmas tree and mounting the Christmas tree in substantially perpendicular relationship with respect to the supporting surface, regardless of the size or shape of the Christmas tree trunk.

Still another object of this invention is to provide a Christmas tree stand including accessory leg extensions which may be removably mounted on and adjustably slidably extended from the respective base legs for further stabilizing the Christmas tree stand when a large Christmas tree is supported in the stand.

SUMMARY OF THE INVENTION

These and other objects of the invention are provided in a new and improved Christmas tree stand which includes a base characterized by an elongated, horizontal bottom base member and an elongated top base member perpendicularly and horizontally mounted on the bottom base member for resting on a supporting surface, a fixed socket bracket bolted or welded to the base and a movable socket bracket adjustably attached to the fixed socket bracket, a ball assembly having a downwardly-extending ball swivally and pivotally secured in the socket brackets and a mount cup mounted on the ball assembly for receiving the trunk of a Christmas tree, wherein the ball assembly and mount cup are rotatably, pivotally and swivally mounted with respect to the base to facilitate vertical orientation of the Christmas tree with respect to the base, regardless of the size or shape of the Christmas tree trunk. In a preferred embodiment an accessory leg extension is slidably and removably mounted on and adjustably extendable from each end of the top base member and bottom base member and a levelling pad is attached to the end of each leg extension, for further stabilizing the stand when a tree is supported therein.

BRIEF DESCRIPTION OF THE DRAWING

The invention will be better understood by reference to the accompanying drawing, wherein:

FIG. 1 is a perspective view of a preferred embodiment of the Christmas tree stand of this invention, with a Christmas tree mounted in the Christmas tree stand and pivotally adjusted to vertical orientation;

FIG. 2 is a front sectional view of the Christmas tree stand, taken along section line 2—2 in FIG. 1;

FIG. 3 is a top sectional view, taken along section line 3—3 in FIG. 1, of the assembled fixed socket bracket and cooperating movable socket bracket elements of the Christmas tree stand of this invention;

FIG. 4 is a top view partially in section of the Christmas tree stand, with an accessory leg extension slidably mounted by means of a first preferred technique on each base leg element of the Christmas tree stand;

FIG. 5 is a side sectional view of a base leg element of the Christmas tree stand, with a leg extension slidably mounted by means of a second preferred technique on the bottom surface of a base leg; and FIG. 6 is a perspective view, partially in section, of the Christmas tree stand of this invention, more particularly detailing the first preferred technique for slidably mounting leg extensions on the base leg elements of the stand.

DESCRIPTION OF THE PREFERRED EMBODIMENTS

Referring initially to FIGS. 1–3 and 5 of the drawing, the Christmas tree stand of this invention is generally illustrated by reference numeral 1. The Christmas tree stand 1 is characterized by a base 2, characterized by an elongated, horizontal bottom base member 3 and a similar top base member 4, disposed perpendicularly and horizontally with respect to the bottom base member 3, with the midpoint of the top base member 4 secured to substantially the midpoint of the bottom base member 3 at a leg junction 11, by means of a junction bolt 11a, extending upwardly through and recessed in the bottom base member 3 and subsequently through the top base member 4 and threaded into a fixed socket bracket 7, as illustrated in FIG. 2. The extending ends of the bottom base member 3 and top base member 4 each define a base leg 5 having a longitudinal leg slot 5a or a terminal leg opening 6 extending vertically therethrough, as illustrated in FIGS. 1 and 6. A levelling pad 44 may be provided on the bottom surface of each end of the base legs 5 of the top base member 4 or on leg extensions 42, for adjustably supporting each base leg 5 of the top base member 4 on the floor and compensating for floor or carpet irregularities. In a most preferred embodiment of the invention, each of the levelling pads 44 are provided with a threaded stud 44a and have a protective face 44b, such as plastic or other suitable material, (see FIG. 5) in order to locate and level the base 2 on a table or floor (not illustrated) without abrading or scratching the surface of the table or floor. The fixed socket bracket 7 may be bolted (see FIG. 2), welded or otherwise fixedly attached to the top surface of the top base member 4 above the leg junction 11 and is slightly offset with respect to the longitudinal axis of the top base member 4. As illustrated in FIG. 3, the fixed socket bracket 7 is characterized by an internal rounded fixed socket seat 8 disposed in a fixed socket block 9, which is provided with threaded fixed block openings 10 therein, as illustrated in FIG. 3. A movable socket bracket 13 is characterized by a rounded movable socket seat 14, disposed in a movable socket block 15, having movable block openings 16 provided therein. The threaded shank of a bracket bolt 19 is designed to project through one of the movable flange openings 16 and a registering one of the threaded fixed flange openings 10, to secure opposing ones of the fixed socket block 9 and the movable socket block 15 together. A T-bar 21 is fitted with a threaded shank 22, having a shank shoulder 23, the extending end of which shank 22 is designed to extend through the other movable block opening 16 in the opposite movable socket block 15 and project through the companion threaded fixed block opening 10 in the opposing fixed socket block 9. This allows tightening of the T-bar shank shoulder 23 of the T-bar 21 against the movable socket block 15 to secure the movable socket block 15 against the opposing fixed socket block 9.

As illustrated in FIG. 2, a ball assembly is generally illustrated by reference numeral 24 and in a preferred embodiment, includes a round assembly plate 25, which is welded to the mount cup base 32 of a mount cup 31. Alternatively, the assembly plate 25 can be provided with spaced plate mount openings (not illustrated). In each case a ball neck 28 extends downwardly from the center of the assembly plate 25. A ball 27 is shaped in the extending end of the ball neck 28 and is designed to pivotally fit in the fixed socket seat 8 and the movable socket seat 14 of the assembled fixed socket bracket 7 and movable socket bracket 13, respectively. The cylindrically-shaped mount cup 31 is disposed above the ball assembly 24 and is characterized by a round cup base 32, and may be provided with a pair of spaced and threaded cup mount openings (not illustrated) and fitted with a centrally-located, upward-standing, inverted, cone-shaped trunk spear 34 (illustrated in FIG. 4). The cup base 32 terminates one end of a cup cylinder 35, which is open at the top and further includes four threaded eye bolt openings 36, provided in spaced relationship around the periphery of the cup cylinder 35, as illustrated in FIG. 2. Each of four eye bolts 37 is provided with a threaded shank 38 for threadable insertion in a corresponding one of the threaded eye bolt openings 36, in order to engage and secure the trunk 40 of a Christmas tree 39 in the mount cup 31, as hereinafter further described. The assembly plate 25 in the ball assembly 24 is preferably welded to the mount cup base 32 of the mount cup 31, as illustrated in FIG. 2. Alternatively, the ball assembly 24 may be designed to bolt to the cup base 32 of the mount cup 31 by means of a pair of plate mount bolts 41 (illustrated in FIG. 4) which extend through base openings (not illustrated) in the mount cup base 32 and threadably engage registering threaded plate openings (not illustrated) in the ball assembly plate 25. In this installation embodiment a pair of flexible seal washers 41a (illustrated in FIG. 4) are provided on the threaded shanks of the plate mount bolts 41, in order to seal the plate mount bolts 41 and allow retention of water in the mount cup 31. Still further in the alternative, the ball 27 can be cast integrally with the mount cup 31, as desired.

Referring now to FIGS. 1 and 4–6 of the drawing, in a preferred embodiment of the invention a leg extension 42 is removably and slidably adjustably mounted on each base leg 5 of the bottom base member 3 and top base member 4 and is characterized by an elongated extension plate 45, having an extension radius 43 formed on one end thereof. An extension flange 46 is formed longitudinally on each edge of the extension plate 45, as illustrated. In one embodiment an extension slot 47 is shaped longitudinally in each extension plate 45 between the extension flanges 46, as illustrated in FIGS. 4 and 6. Alternatively, and in a most preferred embodiment each extension plate 45 is provided with a threaded bolt opening (not illustrated) to receive the threaded end of a wing bolt 48a, after the wing bolt 48a has been extended through a leg slot 5a in the ends of the base legs 5, as illustrated in FIGS. 1 and 5. In either case, as further illustrated in FIG. 6, each leg extension 42 is aligned with a corresponding base leg 5 and then positioned such that the extension plate 45 is located beneath the base leg 5 and the extension flanges 46 are located on each side of the base leg 5. The leg extension 42 is slidably located on the corresponding base leg 5 such that the extension radius 43 is located a selected distance from the extending end of the base leg 5. As illustrated in FIGS. 4 and 6, a bolt 49 receives a washer 50 and is extended upwardly through the extension slot 47 in each leg extension 42 and subsequently through the leg opening 6 in each corresponding base leg 5. The bolt 49 then receives a second washer 50 and a wing nut 48 is threaded on the bolt 49 and tightened against the base leg 5 to secure the leg extension 42 on the base leg 5 at a selected extension with respect to the mount cup 31. More preferably, as described above with respect to FIGS. 1 and 5, the wing bolts 48a can be selectively tightened and loosened in the corresponding threaded openings (not illustrated), provided in the extension plates 45 of the leg extensions 42. Accordingly, in each case, each leg extension 42 may be selectively extended or retracted on the corresponding base leg 5 by loosening the wing nuts 48 on the bolts 49 or the respective wing bolts 48a and slidably extending or retracting each leg extension 42 on the base leg 5, as desired, and again tightening the wing nuts 48 on the bolts 49 or the wing bolts 48a.

Referring again to FIGS. 1–3 of the drawing, the Christmas tree stand 1 is illustrated in assembled configuration with the assembly plate 25 either welded or secured to the cup base 32 of the mount cup 31 by means of the plate mount bolts (not illustrated). Furthermore, the ball 27 element in the ball assembly 24 is seated in the fixed socket seat 8 of the fixed socket bracket 7 and the matching companion movable socket seat 14 of the movable socket bracket 13, as illustrated in FIG. 2. This mounting of the ball assembly 24 to the base 2 is accomplished by first loosening the bracket bolt 19 in the fixed socket block 9 to allow movement between the fixed socket bracket 7 and the companion movable socket bracket 13, which facilitates movement of the opposite ends of the movable socket bracket 13 and the fixed socket bracket 7 away from each other, as illustrated in FIG. 3. The T-bar 21 can then be loosened to release pressure on the ball 27 and allow adjustment of the mount cup 31 and the trunk 40 of the Christmas tree 39. The ball 27 is secured against the fixed socket seat 8 in the fixed socket bracket 7 and the movable socket seat 14 in the movable socket bracket 13, as the T-bar 21 is again tightened on the fixed socket bracket 7, in order to tighten the ball 27 in the fixed socket seat 8 and the movable socket seat 14. Pivoting of the ball assembly 24 and the mount cup 31 with respect to the base 2 is thus accomplished by turning the T-bar 21 in the counter-clockwise direction to loosen the threaded shank 22 in the fixed socket block 9 and allow the ball 27 to pivot inside the fixed socket seat 8 and the movable socket seat 14. Accordingly, referring now to FIGS. 1 and 2 of the drawing, when the trunk 40 of a Christmas tree 39 is inserted in the cup cylinder 35 of the mount cup 31 against the trunk spear 34 (illustrated in FIG. 4) and the eye bolts 37 are tightened against the trunk 40 as illustrated, the T-bar 21 can be loosened and the trunk 40 pivoted from a first position to a second, slightly offset position (not illustrated), to straighten the Christmas tree 39. When the desired positioning of the Christmas tree 39 is effected, the T-bar 21 is again turned in the clockwise direction to tighten the T-bar shank shoulder 23 against the movable socket flange 15 and maintain the ball assembly 24 and the mount cup 31 in the slightly offset position. This offset positioning of the trunk 40 by manipulation of the mount cup 31 and ball assembly 24 locates and maintains the Christmas tree 39 in a substantially vertical upright position, as illustrated. As described above, each leg extension 42 may optionally be removably mounted on each base leg 5 of the Christmas tree stand 1 and selectively slidably located on the base leg 5 a selected distance from the leg junction 11, prior to placing the Christmas tree 39 in the mount cup 31, for further stabilizing the Christmas tree stand 1 on a floor or table, according to the size of the Christmas tree 39.

Referring again to FIG. 1 of the drawings, in a most preferred embodiment of the invention each of the base legs 5 of the base 2, or, when so equipped, the leg extensions 42, are fitted with the levelling pads 44, having plastic faces 44b, in order to level the Christmas tree 39 and prevent scratching or abrasion of the floor or furniture upon which the Christmas tree stand 1 is resting. Furthermore, the Christmas tree stand 1 is easily folded for shipping or storage under circumstances where the base legs 5 are bolted to the fixed socket bracket 7, by loosening the junction bolt 11a and forcing the ends of the base legs 5 toward each other.

Materials of construction for the Christmas tree stand 1 include wood, fiberglass and thermoplastic or thermoresin products of selected density, as well as metal, such as steel and aluminum, in non-exclusive particular. The Christmas tree stand detailed herein is easy to use, light in weight and is characterized by great convenience and flexibility in use and storage.

It will be appreciated that the Christmas tree stand 1 detailed herein can be used to support plants and trees of any description and to orient these plants and trees according to adjustment of the ball assembly 24 and mount cup 31. Accordingly, the mount cup 31 can be constructed to receive any type of plant or tree and when the seal washers 41a are used on the plate mount bolts 41, or under circumstances where the ball 27 is molded or cast integrally with the mount cup 31 or the ball assembly plate 25 is welded to the mount cup base 32 of the mount cup 31, then the mount cup 31 can be filled with water, or bedding material placed in the mount cup 31 can be moistened, without fear of leakage.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A tree stand for supporting a tree, comprising an elongated, horizontal bottom base member and an elongated, horizontal top base member mounted on said bottom base member in perpendicular relationship; a levelling pad provided under each end of said top base member and said bottom base member; a leg slot provided in each end of said bottom base member and said top base member and a leg extension having a threaded extension opening registering with said leg slot and slidably and adjustably mounted on said each end of said bottom base member and said top base member; a bolt extending downwardly through said leg slot and said extension opening for adjustably mounting said leg extension on said bottom base member and said top base member; a fixed socket bracket carried by said top base member and a movable socket bracket removably and adjustably attached to said fixed socket bracket; a mount cup for receiving the trunk of the tree and a ball extending from said mount cup for pivotally and adjustably engaging said fixed socket bracket and said movable socket bracket and locating the tree in a substantially vertical position.

2. The tree stand of claim 1 wherein said mount cup further comprises a cup base and a cup cylinder mounted on said cup base, said cup cylinder having an open top for receiving the trunk of the tree and further comprising means provided in said cup cylinder for engaging the tree trunk and stabilizing the tree in said cup cylinder.

3. The tree stand of claim 1 further comprising an assembly plate carried by said mount cup and a ball neck fixedly carried by said assembly plate and wherein said ball terminates said ball neck.

4. The tree stand of claim 1 wherein:

(a) said mount cup further comprises a cup base and a cup cylinder mounted on said cup base, said cup cylinder having an open top for receiving the trunk of the tree, engaging means threaded in said cup cylinder for engaging the tree and immobilizing the tree in said cup cylinder and further comprising means provided in said cup cylinder for engaging the tree trunk and stabilizing the tree in said cup cylinder; and (b) further comprising an assembly plate carried by said mount cup and a ball neck fixedly carried by said assembly plate and wherein said ball terminates said ball neck.

5. A tree stand for removably supporting a tree, comprising an elongated, horizontal bottom base member and an elongated, horizontal top base member mounted on said bottom base member in fixed, perpendicular relationship; a levelling pad provided under each end of said top base member and said bottom base member for stabilizing said tree stand; a leg opening provided in each end of said bottom base member and said top base member; a leg extension having an extension slot slidably and adjustably mounted on said each end of said bottom base member and said top base member, said extension slot registering with said leg opening; a bolt extending upwardly through said leg opening and said extension slot and a wing nut threaded on said bolt for adjustably mounting said leg extension on said top base member and said bottom base member; a fixed socket bracket carried by said top base member and a movable socket bracket removably and adjustably attached to said fixed socket bracket and a socket shaped in said fixed socket bracket and said movable socket bracket; a ball pivotally engaging said socket in said fixed socket bracket and said movable socket bracket; a T-bar and a bracket bolt, each having a threaded shank threadably engaging said fixed socket bracket and said movable socket bracket in spaced relationship with respect to each other, for adjusting the tension of said movable socket bracket and said fixed socket bracket on said ball; a ball neck extending from said ball and an assembly plate carried by said ball neck; a mount cup having a cup base mounted on said assembly plate and a cup cylinder mounted on said cup base, said cup cylinder having an open top for receiving the trunk of the tree; a trunk spear upward-standing from said cup base for engaging the trunk of the tree and immobilizing the trunk in said mount cup; and engaging means provided in said cup cylinder for engaging the tree trunk and stabilizing the tree in said cup cylinder.

6. The tree stand of claim 5 wherein said engaging means comprises at least three eye bolts threadably carried by said cup cylinder in transverse relationship.

7. The tree stand of claim 5 wherein said leg extension comprises an elongated extension plate, an extension flange shaped longitudinally on each longitudinal edge of said extension plate and an extension bevel formed in the projecting end of said extension plate, and wherein said extension slot is shaped longitudinally in said extension plate between said extension flanges.

* * * * *